(12) United States Patent
Miyamoto

(10) Patent No.: US 12,009,615 B2
(45) Date of Patent: Jun. 11, 2024

(54) MOVABLE SUPPORT STRUCTURE

(71) Applicant: SUMITOMO WIRING SYSTEMS, LTD., Mie (JP)

(72) Inventor: Takeru Miyamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 256 days.

(21) Appl. No.: 17/625,223

(22) PCT Filed: Jun. 4, 2020

(86) PCT No.: PCT/JP2020/022046
§ 371 (c)(1),
(2) Date: Jan. 6, 2022

(87) PCT Pub. No.: WO2021/005926
PCT Pub. Date: Jan. 14, 2021

(65) Prior Publication Data
US 2022/0278479 A1 Sep. 1, 2022

(30) Foreign Application Priority Data
Jul. 10, 2019 (JP) .................................. 2019-128571

(51) Int. Cl.
*H01R 13/516* (2006.01)
*H01R 31/08* (2006.01)

(52) U.S. Cl.
CPC ........... *H01R 13/516* (2013.01); *H01R 31/08* (2013.01)

(58) Field of Classification Search
None
See application file for complete search history.

(56) References Cited

U.S. PATENT DOCUMENTS 3,646,495 A * 2/1972 Cowmeadow ....... H01R 13/516
439/733.1
3,671,921 A * 6/1972 Baker, III ............ H01R 13/502
439/586

(Continued)

FOREIGN PATENT DOCUMENTS

JP 2014-060073 A 4/2014
JP 2017-091803 A 5/2017

OTHER PUBLICATIONS

International Search Report dated Aug. 25, 2020 for WO 2021/005926 A1 (4 pages).

*Primary Examiner* — Krystal Robinson
(74) *Attorney, Agent, or Firm* — Venjuris, P.C.

(57) ABSTRACT

A movable support structure is provided with a first component including a movable supporting portion and a retaining/restricting portion, and a second component including a supported portion and a receiving portion. The movable supporting portion restricts a movement toward a back side in a sliding direction of the supported portion slid toward the movable supporting portion along a first direction. The slid supported portion is supported movably along the first direction and a second direction orthogonal to the first direction. The retaining/restricting portion extends in such a posture as to gradually approach the receiving portion from a position separated from the receiving portion on a side opposite to the second component toward a sliding side of the supported portion.

5 Claims, 6 Drawing Sheets

(56) References Cited

U.S. PATENT DOCUMENTS

| | | | | |
|---|---|---|---|---|
| 4,992,054 A | * | 2/1991 | Cassan | H01R 13/56 |
| | | | | 439/150 |
| 5,773,332 A | * | 6/1998 | Glad | H05K 5/0273 |
| | | | | 439/946 |
| 5,971,777 A | * | 10/1999 | Garside | H01R 24/62 |
| | | | | 439/131 |
| 9,024,183 B2 | | 5/2015 | Sakakura | |
| 2007/0059970 A1 | | 3/2007 | Ichio et al. | |

* cited by examiner

MOVABLE SUPPORT STRUCTURE

CROSS REFERENCE TO RELATED APPLICATIONS

This application is a national phase of PCT application No. PCT/JP2020/022046, filed on 4 Jun. 2020, which claims priority from Japanese patent application No. 2019-128571, filed on 10 Jul. 2019, all of which are incorporated herein by reference.

TECHNICAL FIELD

The present disclosure relates to a movable support structure.

BACKGROUND

Patent Document 1 discloses a configuration in which an interlock connector is movably mounted in a sealing holding member. The interlock connector is supported in a floatable state by being inserted into an insertion groove formed in the holding member. The interlock connector is formed with a resilient locking piece. The holding member is formed with a locked portion to be locked by the resilient locking piece. With the interlock connector inserted in the insertion groove, the resilient locking piece locks the locked portion, whereby the interlock connector is retained.

PRIOR ART DOCUMENT

Patent Document

Patent Document 1: JP 2012-238422 A

SUMMARY OF THE INVENTION

Problems to be Solved

Here, it is desired to make a movable body such as the interlock connector less likely to be detached from a support body.

Accordingly, the present disclosure aims to make a second component less likely to be separated from a first component when the second component is supported relatively movably with respect to the first component.

Means to Solve the Problem

The present disclosure is directed to a movable support structure with a first component including a movable supporting portion and a retaining/restricting portion, and a second component including a supported portion and a receiving portion, wherein the movable supporting portion restricts a movement toward a back side in a sliding direction of the supported portion slid toward the movable supporting portion along a first direction, the slid supported portion is supported movably along the first direction and a second direction orthogonal to the first direction, the retaining/restricting portion extends in such a posture as to gradually approach the receiving portion from a position separated from the receiving portion on a side opposite to the second component toward a sliding side of the supported portion, and a retaining surface formed on a tip of the retaining/restricting portion is capable of contacting the receiving portion in a direction to detach the supported portion with the supported portion slid toward the movable supporting portion.

Effect of the Invention

According to the present disclosure, a second component is less likely to be detached from a first component when the second component is supported relatively movably with respect to the first component.

DETAILED DESCRIPTION TO EXECUTE THE INVENTION

Description of Embodiments of Present Disclosure

Figure 1:
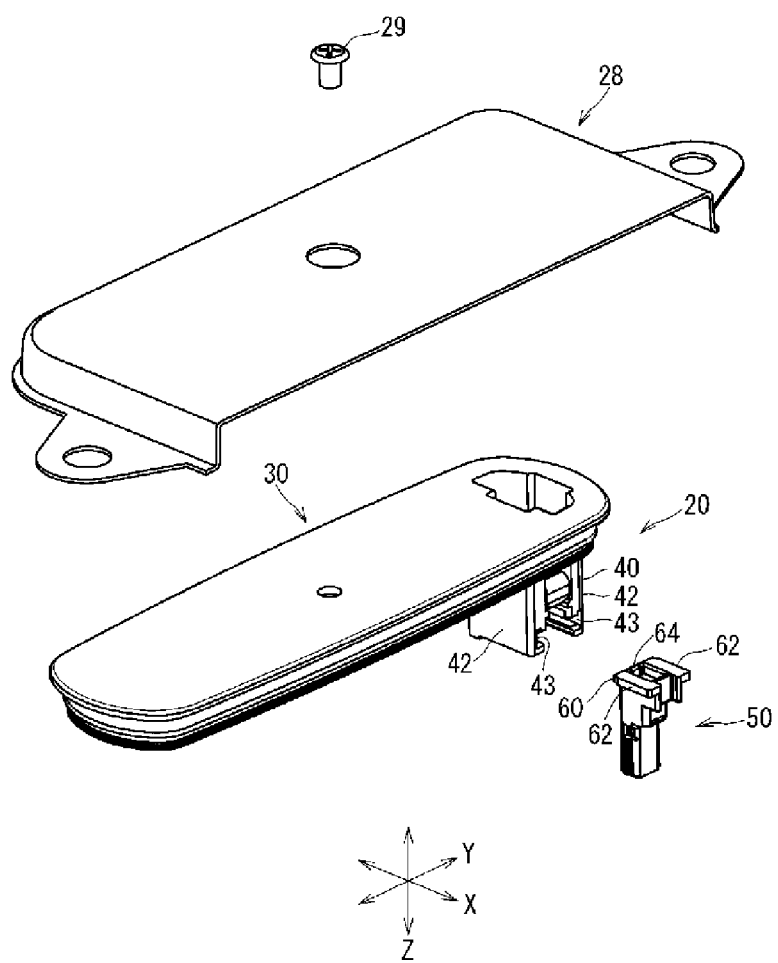
FIG. 1 is an exploded perspective view showing a cover according to an embodiment.

First, embodiments of the present disclosure are listed and described.

The movable support structure of the present disclosure is configured as follows.

(1) The movable support structure is provided with a first component including a movable supporting portion and a retaining/restricting portion and a second component including a supported portion and a receiving portion, wherein the movable supporting portion restricts a movement toward a back side in a sliding direction of the supported portion slid toward the movable supporting portion along a first direction, the slid supported portion is supported movably along the first direction and a second direction orthogonal to the first direction, the retaining/restricting portion extends in such a posture as to gradually approach the receiving portion from a position separated from the receiving portion on a side opposite to the second component toward a sliding side of the supported portion, and a retaining surface formed on a tip of the retaining/restricting portion is capable of contacting the receiving portion in a direction to detach the supported portion with the supported portion slid toward the movable supporting portion. If the supported portion is about to come out from the movable supporting portion, a force in a coming-out direction of the supported portion and a force toward the first component are thought to be applied to the tip part of the retaining/restricting portion. However, such forces are effectively received by the retaining/restricting portion in an oblique posture. Thus, the retaining/restricting portion itself is unlikely to be deformed to displace the tip part toward the first component. In this way, it is suppressed that the hooking of the retaining/restricting portion and the receiving portion is released. In this way, the second connector is less likely to be separated from the first component when the connector is supported relatively movably with respect to the first component.

(2) A pressing surface formed on the tip of the retaining/restricting portion may contact the receiving portion from the side opposite to the second component and press the second component toward a side away from the first component. The second component becomes less likely to rattle with respect to the first component.

(3) A laterally projecting portion may be formed on at least one side part of the tip of the retaining/restricting portion, and the laterally projecting portion may contact the second component from the side opposite to the second component and press the second component toward a side away from the first component.

(4) One of the movable supporting portion and the supported portion may include a pair of inserting projections, the other of the movable supporting portion and the supported portion may include a pair of guide grooves, the pair of inserting projections being inserted into the pair of guide grooves, and retaining projections for partially closing the pair of guide grooves with clearances formed in the pair of guide grooves, the pair of inserting projections being insertable into the clearances, may be formed on insertion opening side end parts of the pair of guide grooves where the pair of inserting projections are inserted. The pair of inserting projections become less likely to come out from the pair of guide grooves and the second component becomes less likely to be separated from the first component.

(5) The movable supporting portion may include a back side receiving portion facing the supported portion slid toward the movable supporting portion along the first direction on the back side in the sliding direction, and the back side receiving portion may include a pair of divided back side receiving portions divided via a clearance in the second direction. The supported portion is stably received by the pair of divided back side receiving portions while weight saving is achieved.

Details of Embodiment of Present Disclosure

A specific example of a movable support structure of the present disclosure is described below with reference to the drawings. Note that the present disclosure is not limited to these illustrations and is intended to be represented by claims and include all changes in the scope of claims and in the meaning and scope of equivalents.

Embodiment

Figure 2:
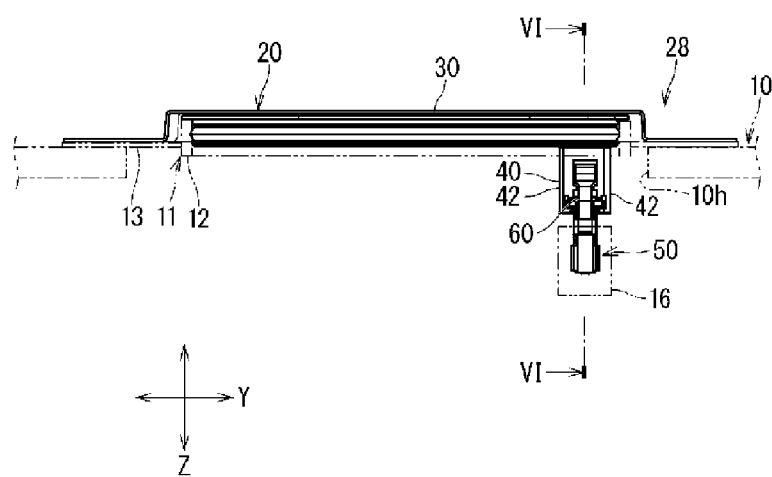
FIG. 2 is a front view showing a state where the cover is mounted in an opening portion of a device housing.

Hereinafter, a movable support structure according to an embodiment is described. In this embodiment, the movable support structure is a cover to be mounted into an opening of a device housing. FIG. 1 is an exploded perspective view showing a cover 20. FIG. 2 is a front view showing a state where the cover 20 is mounted in an opening portion 11 of a device housing 10.

The device housing 10 is a member formed of metal or the like and, for example, a case of an electrical device. This device housing 10 is formed with an opening 10h. The opening portion 11 is mounted in this opening 10h. The opening portion 11 includes a tube portion 12 and a bracket portion 13. The tube portion 12 is formed of resin or the like. Here, the tube portion 12 is formed into an elongated tube shape. The bracket portion 13 is formed of a metal plate or the like. The bracket portion 13 protrudes toward an outer peripheral side of the tube portion 12 in an intermediate part in an axial direction of an outer peripheral part of the tube portion 12. This bracket portion 13 is fixed to the device housing 10 by screws or the like. With the bracket portion 13 fixed to the device housing 10, the tube portion 12 is located in the opening 10h of the device housing 10 in a plan view. For example, the tube portion 12 and the bracket portion 13 are integrated, for example, by molding the tube portion 12 with a part of the bracket portion 13 as an insert.

A space in the tube portion 12 is open inward and outward of the device housing 10. The cover 20 is for closing an outer opening of the tube portion 12.

The cover 20 includes a cover body 30 and a connector 50.

The cover body 30 is a member formed of resin or the like and shaped to be fittable into the tube portion 12. Here, the cover body 30 is in the form of a plate shaped to correspond to the inner peripheral surface shape of the tube portion 12 in a plan view. Since the tube portion 12 is formed into an elongated tube shape here, the cover body 30 is in the form of an oval plate. By fitting the cover body 30 into the tube portion 12, the opening of the tube portion 12 is closed.

Here, a shield cover 28 formed of a metal plate or the like is mounted outside the cover body 30. Here, the shield cover 28 is fixed to the cover body 30, using a screw 29 or the like. With the cover body 30 fit in the tube portion 12, the shield cover 28 covers around the opening portion 11 for electromagnetic shielding. In this state, the shield cover 28 is fixed to the bracket portion 13 by screwing or the like and grounded to the device housing 10. The shield cover 28 is not essential and may be omitted.

The connector 50 is a member to be held relatively movably in a predetermined range with respect to the cover body 30. Here, the connector 50 is held in a part facing the inside of the device housing 10 movably with respect to the cover body 30. A mating connector 16 is provided in the device housing 10 (see FIG. 2). The mating connector 16 is a connector connectable to the connector 50. The mating connector 16 is supported at a position connectable to the connector 50 held by the cover body 30 with the cover body 30 fit in the tube portion 12.

For example, it is assumed that the mating connector 16 is a connector including two terminals and the connector 50 is also a connector including two terminals. Further, the two terminals of the connector 50 are assumed to be conductive with each other by a shorting member such as a wire. If the cover 20 is mounted into the opening portion 11, the connector 50 is connected to the mating connector 16. Then, the two terminals of the mating connector 16 are connected to and conductive with the two corresponding terminals in the connector 50.

Manufacturing errors, assembling errors and the like occur at an arrangement position of the mating connector 16 with respect to the opening portion 11. Further, manufacturing errors, assembling errors and the like occur at a holding position of the connector 50 with respect to the cover body 30. To absorb such errors, the connector 50 is supported movably in the predetermined range with respect to the cover body 30.

In this embodiment, the cover body 30 is an example of a first component having a movable supporting portion and a retaining/restricting portion. The connector 50 is an example of a second component including a supported portion and a receiving portion. A movable supporting portion 40 is provided at a position near one widthwise end part of the cover body 30. Here, the cover body 30 is formed into an elongated shape in a plan view, a longitudinal direction thereof may be called a width direction and a transverse direction thereof may be called a depth direction.

The movable supporting portion 40 movably supports the connector 50. The position of the movable supporting portion 40 is not particularly limited. A supported portion 60 is provided on a base end part of the connector 50. The connector 50 is movably supported by the movable supporting portion 40 via the supported portion 60.

Figure 3:
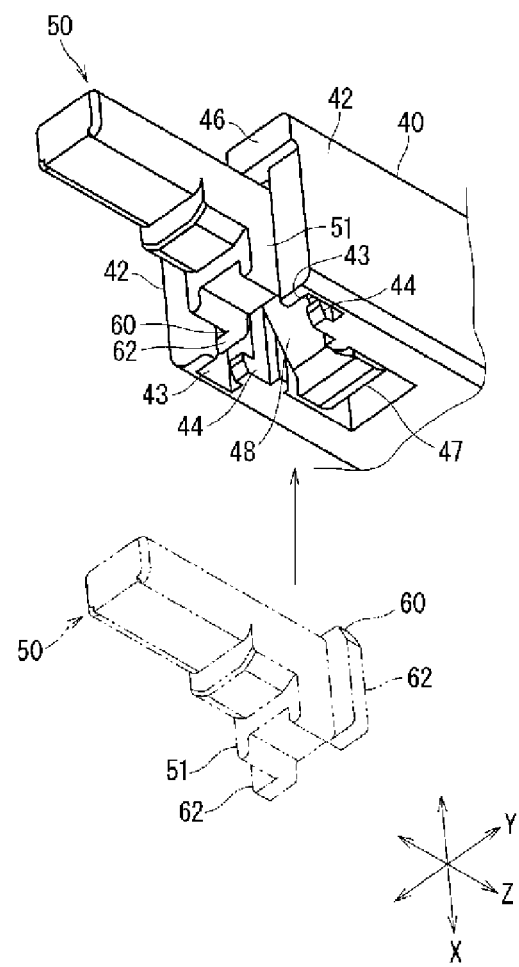
FIG. 3 is a perspective view showing a movable supporting portion and a supported portion.
Figure 4:
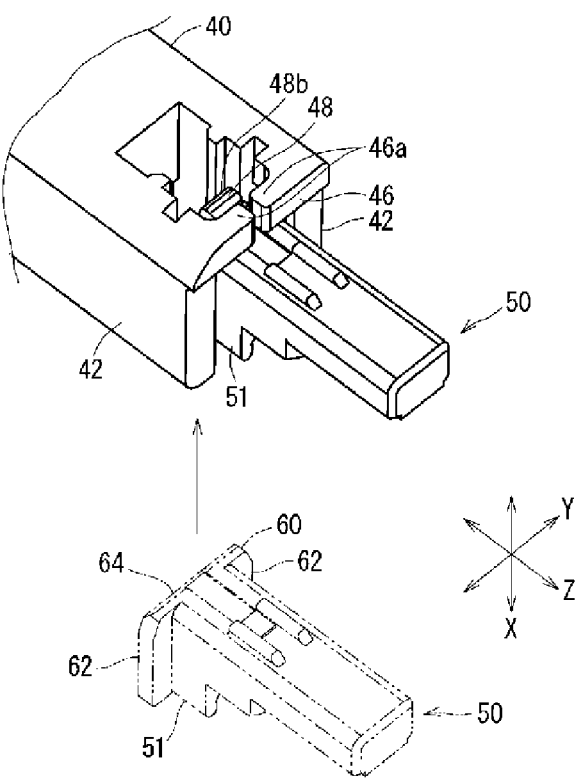
FIG. 4 is a perspective view showing the movable supporting portion and the supported portion.
Figure 5:
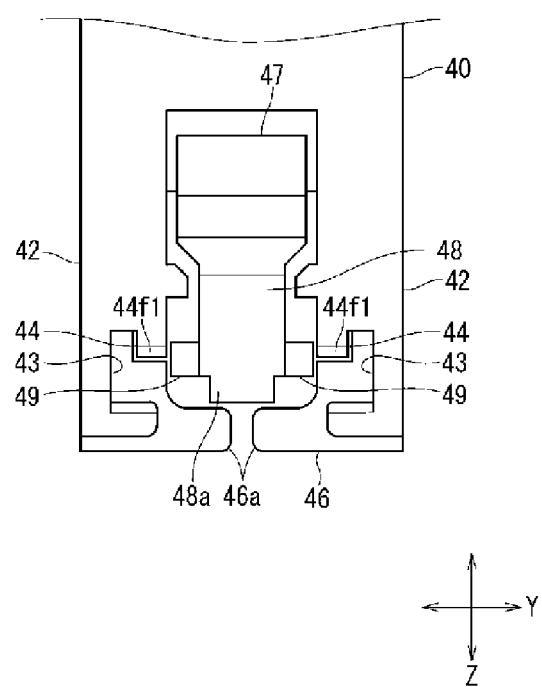
FIG. 5 is a front view of the movable supporting portion.
Figure 6:
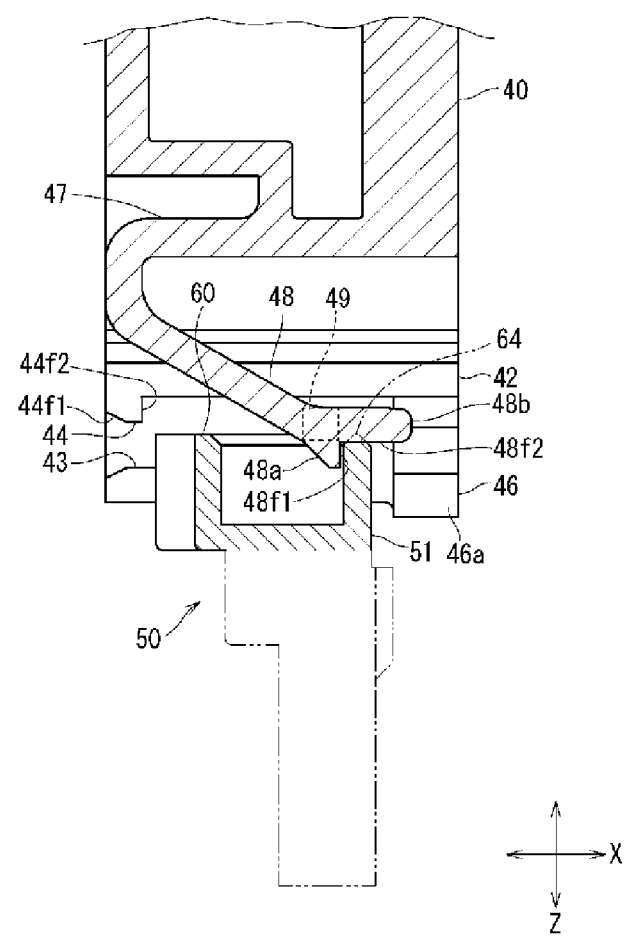
FIG. 6 is a partial section along VI-VI of FIG. 2.

The movable supporting portion 40 and the supported portion 60 are more specifically described. FIGS. 3 and 4 are perspective views showing the movable supporting portion 40 and the supported portion 60. In FIGS. 3 and 4, the supported portion 60 before being supported by the movable supporting portion 40 is shown by virtual lines. FIG. 5 is a front view of the movable supporting portion 40. FIG. 6 is a partial section along VI-VI of FIG. 2.

The movable supporting portion 40 supports the supported portion 60 slid toward the movable supporting portion 40 along a first direction X movably along the first direction X and a second direction Y. Here, the first direction X is a direction in which the supported portion 60 moves toward the movable supporting portion 40 when the supported portion 60 is supported in the movable supporting portion 40. The second direction Y is a direction orthogonal to the first direction X. Here, if an extending direction of the connector 50 with respect to the cover body 30 is a third direction Z, the second direction Y is orthogonal to both the first and third directions X, Z. Note that the third direction Z may be comprehended as a connecting direction of the connector 50 to the connector 16. Further, the movable supporting portion 40 supports the supported portion 60 with a movement of the supported portion 60 toward a back side in a sliding direction restricted in the first direction X.

More specifically, the movable supporting portion 40 includes a pair of slide supporting portions 42 and a back side receiving portion 46.

The pair of slide supporting portions 42 are formed to project while being spaced apart in a part of the cover body 30 facing the device housing 10. The slide supporting portion 42 includes a plate-like part expanding in an XZ plane. The pair of slide supporting portions 42 are facing each other while being spaced apart in the Y direction, and the supported portion 60 is disposed therebetween. A pair of guide grooves 43 are formed in inward facing parts of the pair of slide supporting portions 42 (inward facing parts on tip parts of the slide supporting portions 42). The guide groove 43 is formed along the sliding direction of the supported portion 60, here, along the X direction. The pair of guide grooves 43 are open on sides facing each other and on one end sides in an extending direction. End parts on the one end sides in the extending direction of the pair of guide grooves 43 are insertion opening side end parts into which a pair of inserting projections 62 to be described later are inserted.

Retaining projections 44 are formed on the insertion opening side end parts of the pair of guide grooves 43. This retaining projection 44 partially closes the guide groove 43 on the insertion opening side end part of the guide groove 43. Further, a clearance into which the inserting projection 62 is insertable is formed between the retaining projection 44 and the inner surface of the guide groove 43 on the insertion opening side end part of the guide groove 43. Here, the retaining projection 44 is formed to project from a side of the guide groove 43 on the side of the cover body 30. A clearance having a dimension substantially equal to (preferably equal to) a thickness of the inserting projection 62 is formed between the retaining projection 44 and a surface of the guide groove 43 on the side of the connector 50. Further, the retaining projection 44 has a guide surface 44/1 gradually projecting toward the back side in the sliding direction of the supported portion 60. When the inserting projections 62 are inserted into the guide grooves 43, the inserting projections 62 contact the guide surfaces 44/1, thereby being guided into the above clearances. In this way, the inserting projections 62 are smoothly guided into the guide grooves 43. Further, a surface of the retaining projection 44 on an intermediate side in the extending direction of the guide groove 43 is formed into a stop surface 44/2 orthogonal to the first direction X. With the inserting projections 62 accommodated in the guide grooves 43 beyond the retaining projections 44, the inserting projections 62 contact the stop surfaces 44/2, thereby being unlikely to come out from the guide grooves 43.

The back side receiving portion 46 is provided on back sides of the slide supporting portions 42 in the sliding direction of the supported portion 60. This back side receiving portion 46 is provided at a position facing the supported portion 60 slid toward the movable supporting portion 40 on the back side in the sliding direction.

Here, the back side receiving portion 46 includes a pair of divided back side receiving portions 46a, 46a. The pair of divided back side receiving portions 46a, 46a are respectively provided on the pair of slide supporting portions 42. A part of the divided back side receiving portion 46a closes the other end side in the extending direction of the guide groove 43. Another part of the divided back side receiving portion 46a projects toward a clearance between the pair of slide supporting portions 42 from a tip part of the slide supporting portion 42 on the back side in the sliding direction. The pair of divided back side receiving portions 46a, 46a are divided via a clearance in the second direction Y. The pair of divided back side receiving portions 46a, 46a may be connected to each other.

The supported portion 60 is a part forming the base end part of the connector 50. Here, the base end part 51 of the connector 50 is shaped to project in the first direction X with respect to a tip part of the connector 50. The inserting projections 62 to be described later can be formed to be long by as much as the base end part 51 of the connector 50 projecting further than the tip part. In this way, the inserting projections 62 are easily stabilized in the guide grooves 43.

The supported portion 60 includes the pair of inserting projections 62 projecting from both sides of the base end part 51 of the connector 50. The pair of inserting projections 62 are respectively in the form of elongated plates fittable into the guide grooves 43. An interval between outward facing surfaces of the pair of inserting projections 62 is larger than an interval between the inner surfaces of the pair of slide supporting portions 42, but smaller than an interval between the groove bottom surfaces of the guide grooves 43. Further, a dimension between both side surfaces of the base end part 51 of the connector 50 is smaller than the interval between the inner surfaces of the pair of slide supporting portions 42. Thus, the supported portion 60 on the base end part 51 of the connector 50 can move in a predetermined range along the second direction Y, which is a direction connecting the pair of slide supporting portions 42.

A length of the inserting projection 62 is smaller than that of the guide groove 43. Thus, the inserting projection 62 can be accommodated into the guide groove 43 in the extending direction of the guide groove 43. Note that a width of the guide groove 43 is larger than the thickness of the inserting projection 62. Thus, the inserting projection 62 can move in the guide groove 43 in the third direction Z. Thus, the supported portion 60 is supported movably in a predetermined range also in the third direction Z. As a result, the connector 50 can be inclined in a predetermined range with respect to the cover body 30 and can be inclined in conformity with the posture of the mating connector 16. Thus, the connector 50 is smoothly connected to the mating connector 16.

Further, a movement of the supported portion 60 is restricted by the back side receiving portion 46 when being slid in the first direction X. A movement of the supported portion is restricted by the hooking of a receiving portion 64 to be described next and the retaining/restricting portion 48 in a direction opposite to the sliding direction, i.e. in a direction in which the supported portion 60 comes out from the movable supporting portion 40.

Note that a configuration in which the movable supporting portion supports the supported portion movably in the predetermined range is not limited to the above example. For example, the movable supporting portion may be a protrusion having a T-shaped cross-section and the supported portion may be a groove having a T-shaped cross-section, into which the protrusion having the T-shaped cross-section is loosely slidably fit.

Further, in the above example, the movable supporting portion 40 includes the pair of guide grooves 43 and the supported portion 60 includes the pair of inserting projections 62. Contrary to this configuration, a movable supporting portion may include a pair of inserting projections and a supported portion may include a pair of guide grooves.

The supported portion 60 is retained in the movable supporting portion 40 by the contact of the retaining/restricting portion 48 with the receiving portion 64.

The base end part 51 of the connector 50 is open when viewed from the side of the movable supporting portion 40. The receiving portion 64 is formed on the base end part 51. Here, a tip part of a wall part on the back side in the sliding direction, out of a peripheral wall part surrounding an opening formed in the base end part 51, is the receiving portion 64. The receiving portion 64 is in the form of a plate orthogonal to an extending direction of the pair of inserting projections 62. A part (outward facing part) on the back side in the sliding direction, out of an end edge part of the receiving portion 64, is formed into a chamfered slope shape. Here, a part (inward facing part) on a front side in the sliding direction, out of the end edge part of the receiving portion 64, is also formed into a chamfered slope shape. Both sides of a part backward of the parts formed into the slope shape, out of the receiving portion 64, are surfaces orthogonal to the sliding direction.

The retaining/restricting portion 48 is provided in the movable supporting portion 40. The retaining/restricting portion 48 extends in such a posture as to gradually approach the receiving portion 64 toward a sliding side of the supported portion 60 from a position separated from the receiving portion 64 toward a side opposite to the connector 50. More specifically, an extending base piece 47 extends toward an insertion side of the supported portion 60 from an intermediate part in the first direction X in a back side part of the movable supporting portion 40 between the pair of slide supporting portions 42. The retaining/restricting portion 48 is provided by folding a tip part of the extending base piece 47. The retaining/restricting portion 48 extends in an oblique posture to move in the sliding direction of the supported portion 60 with respect to the movable supporting portion 40 from the back sides toward the tip sides of the pair of slide supporting portions 42 between the pair of slide supporting portions 42. Here, a part of the retaining/restricting portion 48 except the folded part and tip part is in the form of a straight plate. The tip part of the retaining/restricting portion 48 is located near the back side in the sliding direction of the supported portion 60 between the pair of guide grooves 43. With the supported portion 60 inserted to slide in the movable supporting portion 40, the tip part of the retaining/restricting portion 48 is disposed at such a position that this tip part can contact the receiving portion 64. This retaining/restricting portion 48 can be resiliently deformed with a base side thereof as a center. In this way, the retaining/restricting portion 48 can be displaced along the third direction Z, which is a longitudinal direction of the connector 50. Since obliquely extending, the retaining/restricting portion 48 is relatively long. In this way, a sufficient resilient deformation region can be provided to become the retaining/restricting portion 48 while further space saving is achieved.

The tip part of the retaining/restricting portion 48 has a retaining surface 48/1. Here, the tip part of the retaining/restricting portion 48 includes a part 48a projecting toward the connector 50 in the third direction Z. A surface of this part 48a on the back side in the sliding direction of the supported portion 60 is the retaining surface 48/1. With the supported portion 60 slid toward the movable supporting portion 40, the retaining surface 48/1 is arranged to be able to contact the receiving portion 64 in a direction to retain the supported portion 60 (i.e. from the front side in the sliding direction of the supported portion 60).

More specifically, in a natural state where the retaining/restricting portion 48 is not resiliently deformed, the part 48a having the retaining surface 48/1 is present at a position overlapping the receiving portion 64 as seen through along the sliding direction of the supported portion 60. Particularly, even if the inserting projections 62 are in contact with the inner surfaces on the side of the connector 50 in the guide grooves 43 (i.e. even if the supported portion 60 is at a position most distant from the cover body 30 in the movable range by the movable supporting portion 40), this positional relationship is satisfied. Thus, with the supported portion 60 slid and mounted in the movable supporting portion 40, the retaining surface 48/1 of the retaining/restricting portion 48 contacts the receiving portion 64 to retain the supported portion 60. This state is a retained state.

Further, the retaining/restricting portion 48 is resiliently deformable from a posture in the retained state in a direction to be retracted from a relative passage path of the receiving portion 64, i.e. toward the cover body 30, when the supported portion 60 is inserted into the movable supporting portion 40. When the supported portion 60 of the connector 50 is mounted into the movable supporting portion 40 of the cover body 30, the receiving portion 64 contacts an inclined surface of the part 48a from a side opposite to the retaining surface 48/1. In this way, the retaining/restricting portion 48 can be deformed in the direction to be retracted. When the part 48a rides over the receiving portion 64, the retaining/restricting portion 48 returns to the initial shape and the retained state is achieved.

Note that there is a difference between a position where the supported portion 60 is retained by the retaining surface 48/1 and a position where a backward movement of the supported portion 60 is restricted by the back side receiving portion 46. Here, an interval between the retaining surface 48/1 and the back side receiving portion 46 is larger than a thickness of the receiving portion 64. In this way, the supported portion 60 can move in a predetermined range in the first direction X.

The tip part of the retaining/restricting portion 48 has a pressing surface 48/2. Here, the tip part of the retaining/restricting portion 48 includes a part 48b projecting toward the back side in the sliding direction of the supported portion 60 in the first direction X. A surface of this part 48b facing the connector 50 in the third direction Z is the pressing surface 48/2. The pressing surface 48/2 is provided at such a position that the pressing surface 48/2 can contact the receiving portion 64 from the side of the cover body 30 with the inserting projections 62 accommodated in the guide grooves 43. For example, the pressing surface 48/2 is provided at such a position that the pressing surface 48/2 can contact receiving portion 64 from the side of the cover body 30 with the inserting projections 62 held in contact with the inner surfaces on the side of the connector 50 in the guide grooves 43 (i.e. with the supported portion 60 located at the position most distant from the cover body 30 in the movable range by the movable supporting portion 40). FIG. 6 shows a state where the part 48b having the pressing surface 48/2 is disposed in a region overlapping the receiving portion 64 in an initial state where the retaining/restricting portion 48 is not resiliently deformed. With the supported portion 60 slid and inserted into the movable supporting portion 40, the pressing surface 48/2 formed on the tip of the retaining/restricting portion 48 contacts the receiving portion 64 from the side opposite to the connector 50 and presses the connector 50 toward a side away from the cover body 30.

Further, a laterally projecting portion 49 is formed on at least one side part of the tip of the retaining/restricting portion 48. Here, a pair of the laterally projecting portions 49 are formed on both side parts of the tip of the retaining/restricting portion 48. More specifically, the laterally projecting portions 49 are provided closer to the cover body 30 than the part 48a on the tip part of the retaining/restricting portion 48. The positions of the pressing surface 48/2 and the laterally projecting portions 49 are shifted in the first direction X. Surfaces of the laterally projecting portions 49 on the side of the connector 50 are provided at the same position as the pressing surface 48/2 in the third direction Z. With the pressing surface 48/2 held in contact with the receiving portion 64, the laterally projecting portions 49 are in contact with the supported portion 60 from the side of the cover body 30. Here, the pair of laterally projecting portions 49 are in contact with both side wall parts, out of the peripheral wall part surrounding the opening in the base end part 51 of the connector 50. In this way, the pair of laterally projecting portions 49 also contact the connector 50 from the side opposite to the connector 50 and press the connector 50 in a direction away from the cover body 30.

According to the movable support structure configured as just described, the retaining/restricting portion 48 extends in such a posture as to gradually approach the receiving portion 64 from the position separated from the receiving portion 64 on the side opposite to the connector 50 toward the sliding side of the supported portion 60. The restricting surface 48/1 of the tip part of the retaining/restricting portion 48 contacts the receiving portion 64 to retain the supported portion 60. If the supported portion 60 is about to come out from the movable supporting portion 40, a force in a coming-out direction of the supported portion 60 and a force in a direction toward the cover body 30 are thought to be applied to the tip part of the retaining/restricting portion 48. However, such forces are effectively received by rigidity in the extending direction of the retaining/restricting portion 48 in the oblique posture. Thus, the retaining/restricting portion 48 itself is unlikely to be deformed to displace the tip part toward the cover body 30. In this way, it is suppressed that the hooking of the retaining/restricting portion 48 and the receiving portion 64 is released. In this way, the connector 50 is less likely to be separated from the cover body 30 when the connector 50 is supported relatively movably with respect to the cover body 30.

Further, the pressing surface 48/2 formed on the tip of the retaining/restricting portion 48 contacts the receiving portion 64 from the side opposite to the connector 50 and presses the connector 50 toward the side away from the cover body 30. Thus, the connector 50 is unlikely to rattle with respect to the cover body 30. In this way, the vibration of the connector 50 is, for example, suppressed. Further, other measures for suppressing the vibration of the connector 50 become unnecessary. This configuration is effective as a configuration for suppressing the vibration of the connector 50 when a large movable width of the supported portion 60 with respect to the movable supporting portion 40 is set.

Further, since the connector 50 is pressed toward the side away from the cover body 30 by the laterally projecting portions 49, the connector 50 is less likely to rattle with respect to the cover body 30. The laterally projecting portions 49 may be omitted. Particularly, by providing the laterally projecting portions 49 on both sides of the pressing surface 48/2, the tip part of the retaining/restricting portion 48 can stably press the connector 50.

Further, since the retaining projections 44 are provided in the guide grooves 43, the inserting projections 62 are less likely to come out from the guide grooves 43 and the connector 50 is less likely to be separated from the cover body 30.

Further, the tip part of the retaining/restricting portion 48 presses the receiving portion 64 toward the connector 50 on the back side in the sliding direction of the supported portion 60. Thus, the connector 50 is easily inclined toward the front side in the sliding direction of the supported portion 60, in other words, possibly easily inclined to displace end parts of the inserting projections 62 on the side of the retaining projections 44 toward the cover body 30. In this embodiment, the retaining projections 44 are provided on the side of the cover body 30 in the guide grooves 43. Thus, even if the connector 50 is inclined as described above, the inserting projections 62 easily contact the retaining projections 44 and the supported portion 60 is effectively prevented from coming out from the movable supporting portion 40.

Further, since the pair of divided back side receiving portions 46a, 46a are divided via the clearance, the pair of divided back side receiving portions 46a, 46a can stably receive the supported portion 60 while weight saving is achieved. Further, the amount of used resin can also be reduced.

[Modification]

In the above embodiment, the cover body 30 is a first component and the connector 50 is a second component. Contrary to this relationship, a cover body may be a second component and a connector may be a first component. In this case, the connector is provided with a movable supporting portion and a retaining/restricting portion and the cover body is provided with a supported portion and a receiving portion.

Note that the respective components described in the above embodiment and modification can be combined as appropriate without contradicting each other.

LIST OF REFERENCE NUMERALS 10 device housing
10h opening
11 opening portion
12 tube portion 13 bracket portion
16 mating connector
20 cover
28 shield cover
29 screw
30 cover body
40 movable supporting portion
42 slide supporting portion
43 guide groove
44 retaining projection
44/1 guide surface
44/2 stop surface
46 back side receiving portion
46a divided back side receiving portion
47 extending base piece
48 retaining/restricting portion
48a part
48b part
48/1 retaining surface
48/2 pressing surface
49 laterally projecting portion
50 connector
51 base end part
60 supported portion
62 inserting projection
64 receiving portion
X first direction
Y second direction
Z third direction

What is claimed is:

1. A movable support structure, comprising:
a first component including a movable supporting portion and a retaining/restricting portion; and
a second component including a supported portion and a receiving portion,
wherein:
the movable supporting portion restricts a movement toward a back side in a sliding direction of the supported portion slid toward the movable supporting portion along a first direction,
the slid supported portion is supported movably along the first direction and a second direction orthogonal to the first direction,
the retaining/restricting portion extends in such a posture as to gradually approach the receiving portion from a position separated from the receiving portion on a side opposite to the second component toward a sliding side of the supported portion, and
a retaining surface formed on a tip of the retaining/restricting portion is capable of contacting the receiving portion in a direction to detach the supported portion to retain the supported portion with the supported portion slid toward the movable supporting portion,
wherein in a retained position, the receiving portion is movable in a predetermined range away from the retaining surface along the first direction.

2. The movable support structure according to claim 1, wherein:
a pressing surface formed on the tip of the retaining/restricting portion contacts the receiving portion from the side opposite to the second component and presses the second component toward a side away from the first component.

3. The movable support structure according to claim 1, wherein:
a laterally projecting portion is formed on at least one side part of the tip of the retaining/restricting portion, and
the laterally projecting portion contacts the second component from the side opposite to the second component and presses the second component toward a side away from the first component.

4. The movable support structure according to claim 1, wherein:
one of the movable supporting portion and the supported portion includes a pair of inserting projections,
the other of the movable supporting portion and the supported portion includes a pair of guide grooves, the pair of inserting projections being inserted into the pair of guide grooves, and
retaining projections for partially closing the pair of guide grooves with clearances formed in the pair of guide grooves, the pair of inserting projections being insertable into the clearances, are formed on insertion opening side end parts of the pair of guide grooves where the pair of inserting projections are inserted.

5. The movable support structure according to claim 1, wherein:
the movable supporting portion includes a back side receiving portion facing the supported portion slid toward the movable supporting portion along the first direction on the back side in the sliding direction, and
the back side receiving portion includes a pair of divided back side receiving portions divided via a clearance in the second direction.

* * * * *